US012167284B2

(12) United States Patent
Menon

(10) Patent No.: US 12,167,284 B2
(45) Date of Patent: Dec. 10, 2024

(54) MULTI-OPERATOR RADIO ACCESS NETWORK

(71) Applicant: AT&T Intellectual Property I, L.P., Atlanta, GA (US)

(72) Inventor: Sreejith Menon, Herndon, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 301 days.

(21) Appl. No.: 17/685,956

(22) Filed: Mar. 3, 2022

(65) Prior Publication Data
US 2023/0284104 A1 Sep. 7, 2023

(51) Int. Cl.
*H04W 36/00* (2009.01)
(52) U.S. Cl.
CPC ... *H04W 36/0061* (2013.01); *H04W 36/0058* (2018.08)
(58) Field of Classification Search
CPC ... H04W 48/18; H04W 24/02; H04W 84/042; H04W 72/56; H04W 16/14; H04W 36/0061; H04W 36/0058; H04M 15/8214; H04M 15/66; H04L 12/1407; H04L 41/40
See application file for complete search history.

(56) References Cited

U.S. PATENT DOCUMENTS

| | | | |
|---|---|---|---|
| 7,305,251 B2 | 12/2007 | Kuchibholta et al. | |
| 2016/0105915 A1* | 4/2016 | Zhang | H04W 48/12 370/329 |
| 2018/0109945 A1* | 4/2018 | Kweon | H04W 48/18 |
| 2022/0039101 A1* | 2/2022 | Wang | H04W 52/0206 |
| 2022/0046530 A1* | 2/2022 | Lai | H04W 48/16 |
| 2022/0264370 A1* | 8/2022 | Qiao | H04W 28/0967 |
| 2023/0026417 A1* | 1/2023 | Thantharate | H04W 36/36 |

OTHER PUBLICATIONS

Cisco, "Cisco Vision: 5G-Thriving Indoors" Whitepaper, Feb. 13, 2017, printed from https://www.cisco.com/c/dam/en/us/solutions/collateral/service-provider/ultra-services-platform/5g-ran-indoor.pdf, 6 pages.
Nokia, "Network Sharing: Delivering mobile broadband more efficiently and at lower cost", Mar. 23, 2016, printed from https://onestore.nokia.com/asset/200192, 15 pages.
Parallel Wireless, "Multi-Operator Core Networks(MOCN)", downloaded from Multi-Operator Core Networks (MOCN) • Parallel Wireless accessed Feb. 9, 2022, downloaded Aug. 10, 2022, 3 pages.

* cited by examiner

*Primary Examiner* — Quoc Thai N Vu

(57) ABSTRACT

A processing system of a radio access network may obtain an attach request from a user equipment to the radio access network, identify a first cellular core network of a first mobile network operator associated with the user equipment from among a plurality of cellular core networks of a plurality of mobile network operators in communication with the radio access network, generate a first record that includes an identifier of the user equipment, at least one quality class indicator, and at least one radio access network resource utilization metric for a utilization of the radio access network by the user equipment associated with the at least one quality class indicator, and transmit the first record to at least one of: the first cellular core network of the first mobile network operator or a second cellular core network of a second mobile network operator of the plurality of network operators.

20 Claims, 4 Drawing Sheets

| UE | QCI | USAGE MINUTES | DATA USAGE | SPECTRUM BAND | MNO ID |
|---|---|---|---|---|---|
| AAA-AAA (E.G., UE 116) | 1 | 10 | -- | X | 1 |
| AAA-AAA | 2 | 5 | 4MB | X | 1 |
| BBB-BBB | 5 | 2 | 10MB | Y | 1 |
| BBB-BBB | 9 | 5 | 4 MB | Z | 1 |
| ... | ... | ... | ... | ... | ... |
| CCC-CCC (E.G., UE 117) | 1 | 15 | -- | X | 2 |
| DDD-DDD | 2 | 2 | 10MB | W | 2 |
| DDD-DDD | 8 | 10 | 8MB | Z | 2 |
| ... | ... | ... | ... | ... | ... |

FIG. 2

MULTI-OPERATOR RADIO ACCESS NETWORK

The present disclosure relates generally to cellular networks, and more particularly to methods, computer-readable media, and apparatuses for identifying a first cellular core network associated with a user endpoint from among a plurality of cellular core networks in communication with a radio access network (RAN) and transmitting a usage record for radio access network usage of the user endpoint to at least one of: the first cellular core network or a second cellular core network.

BRIEF DESCRIPTION OF THE DRAWINGS

The present disclosure can be readily understood by considering the following detailed description in conjunction with the accompanying drawings, in which:

FIG. 2 illustrates an example RAN usage record, according to the present disclosure;

To facilitate understanding, identical reference numerals have been used, where possible, to designate identical elements that are common to the figures.

DETAILED DESCRIPTION

Figure 1:
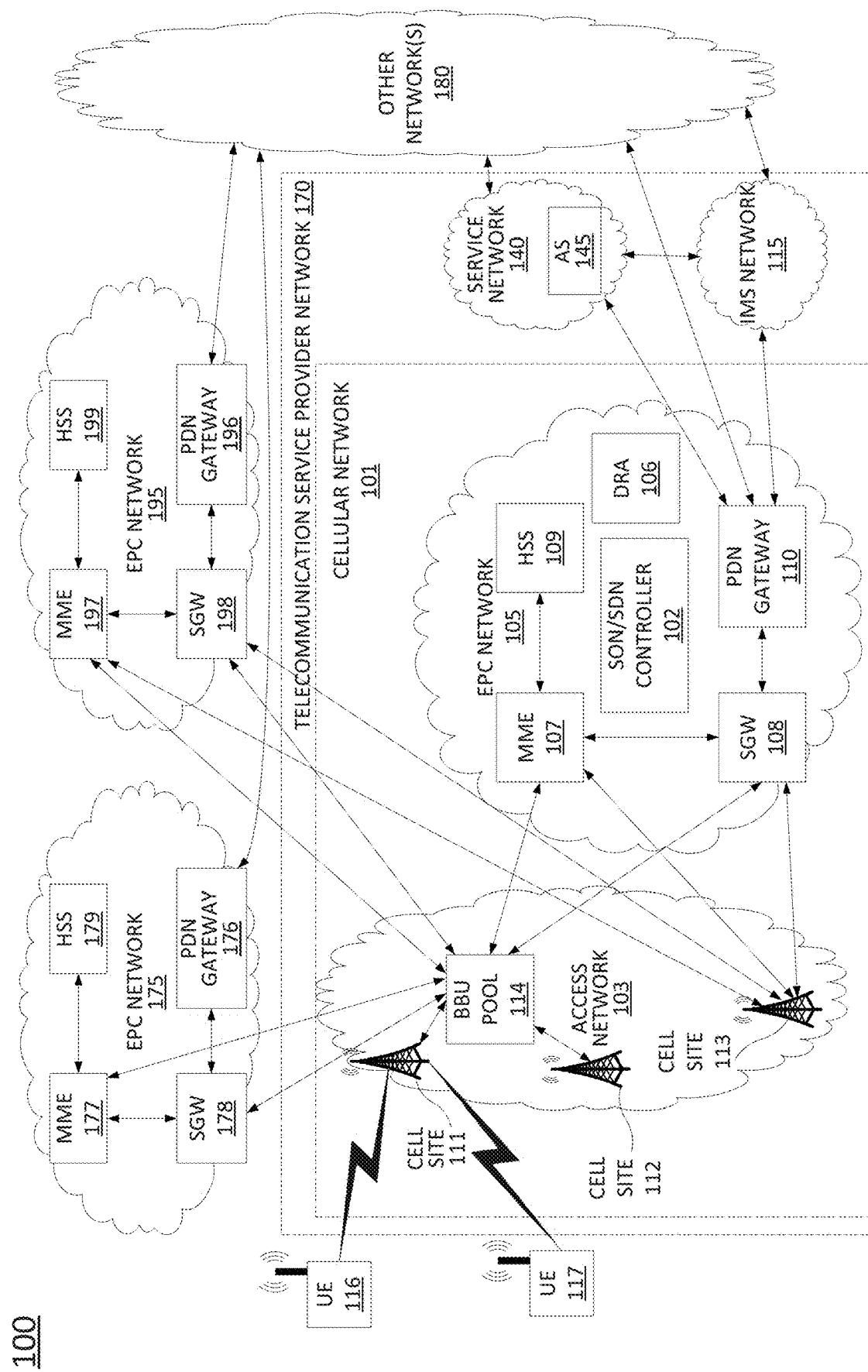
FIG. 1 illustrates an example of a system including a telecommunications service provider network, according to the present disclosure.

Examples of the present disclosure include methods, non-transitory (i.e., tangible and/or physical) computer-readable media, and apparatuses for identifying a first cellular core network associated with a user endpoint from among a plurality of cellular core networks in communication with a radio access network and transmitting a usage record for radio access network usage of the user endpoint to at least one of: the first cellular core network or a second cellular core network. For instance, in one example, a processing system of a radio access network including at least one processor may obtain an attach request from a user equipment to the radio access network, identify a first cellular core network of a first mobile network operator associated with the user equipment from among a plurality of cellular core networks of a plurality of mobile network operators in communication with the radio access network, generate a first record that includes an identifier of the user equipment, at least one quality class indicator, and at least one radio access network resource utilization metric for a utilization of the radio access network by the user equipment associated with the at least one quality class indicator, and transmit the first record to at least one of the first cellular core network of the first mobile network operator or a second cellular core network of a second mobile network operator of the plurality of network operators.

Interest in the use of private cellular networks has recently been growing. With 5G and Citizens Broadband Radio Service (CBRS) spectrum, more nontraditional mobile network operators (MNOs) are seeking to test and implement private cellular networks for their campuses, facilities, cities, etc. The total scope of deploying and maintaining a cellular network is challenging for traditional cellular network operators and will continue being a challenge for the private cellular network operators as well. In some cases a network sharing model may be used between a host MNO (e.g., a traditional cellular network operator/carrier) and a private cellular MNO (or another carrier that may partner with the host MNO in some circumstances). For example, a host MNO may share radio access network (RAN) resources (and in some cases, all or some core network assets). As such, a private cellular MNO may avoid having to separately deploy these assets and may leverage an industry standards-based RAN that has been built and is being operated by a traditional MNO. A private cellular MNO may then focus on providing server/application functionality for its campus, facility, city, etc. For instance, the private cellular MNO may deploy and operate its own cellular core network (or "packet core").

Examples of the present disclosure provide for a host MNO to identify the RAN utilization for each participating MNO. Thus, the host MNO can charge or monetize the sharing of the RAN assets on an "as-use" basis. In contrast, some network sharing models may exchange wholesale value that is fixed based on the number of subscribers and other parameters. For example, a rural network operator may have a cellular footprint in an area and a large cellular carrier may pay a fixed amount to provide its subscribers with cellular access via the rural network operator's network. The user endpoints of the large cellular carrier may then roam on the rural network operator's cellular network, with all usage encompassed within the wholesale agreement. However, for a private cellular MNO, usage by its users' endpoint devices may vary from negligible to medium traffic on most calendar days of a year, with sudden spikes on certain days, or vice versa. In this regard, examples of the present disclosure may provide better visibility and control for both the private MNO and for the host MNO for network optimization, as well as for controlling costs and for monetization. To illustrate, call detail records (CDRs) may typically be generated in the cellular core network such as by a serving gateway (SGW), a packet data gateway (PDG or packet data network (PDN) gateway), IP Multimedia Subsystem (IMS) core elements, etc. In this case, a host MNO may lack visibility into the RAN usage by users/subscribers of other guest MNOs (e.g., private cellular MNO(s) and/or other carrier(s)) since CDRs for these user endpoints are not be generated by the core network components of the host MNOs cellular network.

Examples of the present disclosure include a RAN usage record for each user endpoint, or user equipment (UE) that attaches to the RAN (e.g., each UE that attaches to a base station (e.g., an eNodeB, gNB, or the like) of the RAN). The RAN may interface to multiple cellular core networks, which may include a host MNO cellular core network. In one example, an identifier may be configured on the shared RAN to identify the host core. In one example, any time a UE attaches to the shared RAN, the RAN may create a new record (e.g., a RAN usage record). For instance, the RAN usage record may include an identifier of the UE (such as an International Mobile Subscriber Identity (IMSI), International Mobile Equipment Identity (IMEI) or the like). The RAN usage record may also include at least one quality of service (QoS) type, or quality class identifier (QCI), and at least one corresponding RAN utilization metric, such as duration(s) of time in idle and/or connected modes for each different QCI type, a bandwidth utilized for each QCI type, an inbound, outbound, or overall data volume for the UE for each QCI type, and so forth. In one example, the RAN may provide the RAN usage record to the cellular core with which the UE is associated. In one example, the RAN usage record may also be provided to the host MNO's cellular core network. In one example, the RAN may maintain sets of separate records for each guest MNO (and for the host MNO). In one example, the RAN may maintain records of usage by UEs associated with each MNO, and may filter out records for providing to respective MNOs. In one example, aggregate records may be generated by the RAN for a host MNO that indicate an overall utilization of the RAN by UEs associated with different MNOs. In one example, the aggregate records may further distinguish by different classes of UEs for each MNO.

Notably, examples of the present disclosure provide a finer and granular level of control for RAN usage, optimization, and billing. From the host perspective, the host MNO may control, configure, and/or adjust RAN resources based on the number of bearers, the bandwidth, the spectrum, and other factors being utilized by UEs of each MNO. For instance, the host MNO may reconfigure the RAN in response to QCI type, minutes, data, bandwidth, or other metrics of use, the spectrum bands and/or quantity of spectrum used by UEs of each guest MNO and for each QCI type, and so forth. For example, the host MNO may adjust transmit power, tilt, or other aspects which may change a footprint of a cell, may change handover parameters or change to a different handover algorithm, may steer more UEs of a particular guest MNO to a particular spectrum band or away from a particular spectrum band, may activate or deactivate one or more spectrum bands, may allow UEs to use more or less secondary bearers, and so forth. In addition, guest MNOs may obtain transparent details indicative of how charges are being accrued and how the guest MNO's UEs are utilizing the shared RAN resources on an as-needed basis. These and other aspects of the present disclosure are discussed in greater detail below in connection with the examples of FIGS. 1-4.

To better understand the present disclosure, FIG. 1 illustrates an example system 100 in which examples of the present disclosure may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and an IP Multimedia Subsystem (IMS) network 115 (or IMS core network). In one example, the cellular network 101 comprises an access network 103 and a core network, Evolved Packet Core (EPC) network 105. In one example, telecommunication service provider network 170 may comprise a host MNO that provides for shared use of access network 103 by other MNOs. For instance, as illustrated in FIG. 1, the system 100 also includes evolved packet core (EPC) networks 175 and 195, e.g., guest MNO cellular core networks. The system 100 may further include other networks 180 connected to the telecommunication service provider network 170. FIG. 1 also illustrates various mobile endpoint devices, e.g., user endpoints, or user equipment (UE) 116 and 117. The UEs 116 and 117 may each comprise a cellular telephone, a smartphone, a tablet computing device, a laptop computer, a pair of computing glasses, a wireless enabled wristwatch, or any other cellular-capable mobile telephony and computing devices (broadly, "a mobile endpoint device").

In one example, the access network 103 may comprise a cloud RAN. For instance, a cloud RAN is part of the 3rd Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of cell sites 111-113 may comprise a 5G "new radio" (NR) base station.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (user equipment) tracking and paging (e.g., such as retransmissions), bearer activation and deactivation process, selection of the SGW, and authentication of a user. In one example, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter Routing Agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 102.

In one example, SON/SDN controller 102 may function as a self-optimizing network (SON) orchestrator that is responsible for activating and deactivating, allocating and deallocating, and otherwise managing a variety of network components. In one example, SON/SDN controller 102 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

As noted above, private cellular MNOs may operate cellular core networks, while obtaining shared usage of another MNO's RAN. In the example, of FIG. 1, EPC network 175 (e.g., a cellular core network of a first guest MNO) may include a PDN gateway 176, MME 177, SGW 178, and HSS 179. Similarly, EPC network 195 (e.g., a cellular core network of a second guest MNO) may include a PDN gateway 196, MME 197, SGW 198, and HSS 199. For instance, these components may be the same or similar to the corresponding elements of EPC network 105 discussed above, and may have the same or similar functions. Notably, the respective MMEs 177 and 197 and SGWs 178 and 198 of EPC networks 175 and 195 may be in communication with BBU pool 114 and/or cell site 113. For ease of illustration, various additional components of EPC networks 175 and 195, as well as various connections between EPC networks 175 and 195, and or the components thereof, and other networks, and so forth, are omitted from FIG. 1.

Figure 4:
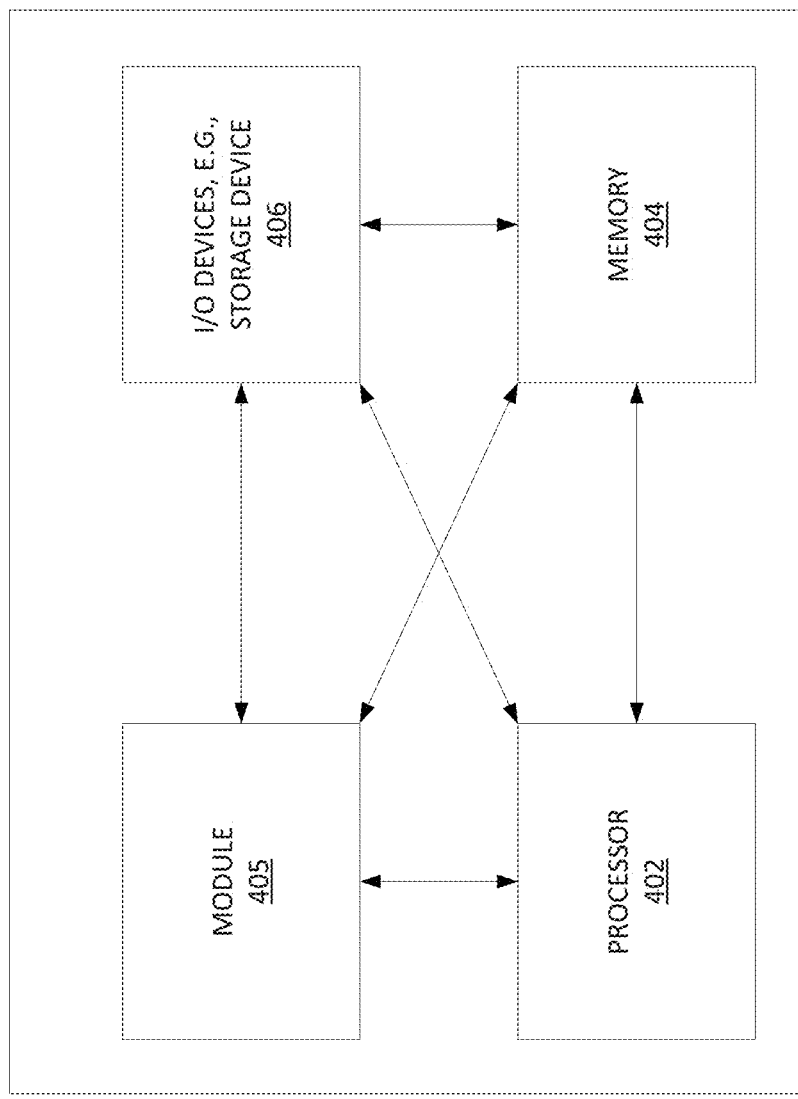
FIG. 4 illustrates a high-level block diagram of a computing device specifically programmed to perform the functions described herein.

In one example, BBU pool 114 and/or BBUs of BBU pool 114 may each comprise programs, logic, or instructions for performing functions for identifying a first cellular core network associated with a user endpoint from among a plurality of cellular core networks in communication with a radio access network and transmitting a usage record for radio access network usage of the user endpoint to at least one of the first cellular core network or a second cellular core network. For example, BBU pool 114 and/or BBUs of BBU pool 114 may each comprise a computing system or device, such as computing system 400 depicted in FIG. 4, and may be configured to provide one or more operations or functions in connection with the example method 300, as described herein. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below, and which may include central processing units (CPUs), graphics processing units (GPUs), programmable logic devices (PLDs), and so forth) or multiple computing devices collectively configured to perform various steps, functions, and/or operations in accordance with the present disclosure.

In an illustrative example, BBU pool 114 may be tasked with and configured to attach user endpoints to respective ones of the EPC networks 105, 175, and 195. For instance, UE 116 may seek to connect to access network 103 via cell site 111 by transmitting an attach request, or the like. The attach request may include an identifier of the UE 116, such as an IMSI, IMEI, M-TMSI or the like, or multiple such identifiers. In one example, a BBU in BBU pool 114 may then identify which EPC network from among EPC networks 105, 175, and 195 is associated with UE 116. In one example, the attach request may include an MNO identifier and/or EPC identifier that identifies the associated EPC network, which for illustrative purposes may be EPC network 175. For instance, UE 116 may indicate its "home network" to which the UE 116 should preferentially be attached, when available. Alternatively, or in addition, the cell site 111 may broadcast MNO identifiers and/or EPC identifiers for each of EPC networks 105, 175, and 195. UE 116 may then select one of the EPC networks for attachment by including the associated identifier in the attach request. For example, the selection logic of the UE 116 may preferentially select the home network of the UE 116 (e.g., EPC network 175).

Accordingly, a BBU in BBU pool 114 that receives and processes the attach request from UE 116 may be directed to communicate with MME 177 in order to continue the attach procedure with EPC network 175. For instance, MME 177 may communicate with HSS 179 to retrieve and verify subscriber information, and so forth. In turn, a default bearer may be established between UE 116 and PDN gateway 176 via cell site 111, BBU pool 114, and SGW 178. In addition, one or more dedicated bearers may be established in connection with the default bearer and/or additional default bearers may be established for UE 116 with different IP addresses. In any case, as noted above, data usage of UE 116 (e.g., including voice calls, video calls, video streaming, text messaging, internet data, and so forth) may result in one or more call detail records (CDRs) being generated within EPC network 175, e.g., by one or more of SGW 178, PDN gateway 176, and/or other component(s). However, in accordance with the present disclosure, access network 103 may also generate radio access network (RAN) utilization records that specifically record aspects of the usage of access network 103 by UE 116 (and similarly for other UEs that attach to access network 103). In particular, BBU pool 114 may generate a RAN utilization record that may contain information including an identifier of the UE 116, at least one QCI, and at least one RAN utilization metric for a utilization of the access network 103 by UE 116 associated with the at least one QCI.

To illustrate, FIG. 2 shows an example table 200 of RAN usage records. For instance each record (e.g., each line/row in the example table 200) includes a UE identifier, a QCI value (e.g., ranging from 1 to 9, or the like), one or more usage metrics (e.g., in the example of FIG. 2 usage minutes and/or data usage), and spectrum band used. Thus, as can be seen in the figure, there may be multiple entries for a same UE, e.g., one per QCI that may have been used by the UE. In one example, each entry may also include a MNO identifier (ID), to indicate the MNO and/or EPC network to which a UE is/was attached with respect to the RAN usage for a particular QCI class. Alternatively, or in addition, separate tables may be maintained for different guest MNOs (and for the host MNO). For instance, table 200 may be split into table 205 for a first MNO with MNO ID "1" (e.g., EPC network 175) and table 207 for a second MNO with MNO ID "2" (e.g., EPC network 195). In such case, the MNO ID field may be omitted from each record in the respective tables. In addition, it should be noted that a similar table may be maintained for a third EPC network/MNO (e.g., the host EPC network 105 of FIG. 1), and so forth.

Continuing with the example of FIG. 1, and in reference to the table 200 of FIG. 2, there may be two entries for UE 116 having ID AAA-AAA. For instance, UE 116 may have made one or more telephone calls lasting for 10 minutes in total via cell site 111 and access network 103. In addition, the call(s) may have been given a priority in accordance with a QCI label of "1" and used spectrum band X. UE 116 may also have engaged in a video call totaling 5 minutes and 4 MB of data usage, which may have been afforded a priority in accordance with a QCI label of "2" and utilizing spectrum band X.

Similarly, referring again to FIG. 1, UE 117 may connect to access network 103 via cell site 111 by transmitting an attach request that may include an identifier of the UE 117 (and in one example an identifier of the MNO associated with UE 117, e.g., e.g., EPC network 195). Accordingly, a BBU in BBU pool 114 that receives and processes the attach request from UE 117 may be directed to communicate with MME 197 to continue the attach procedure with EPC network 195. For instance, MME 197 may communicate with HSS 199 to retrieve and verify subscriber information, and so forth. In turn, a default bearer may be established between UE 117 and PDN gateway 196 via cell site 111, BBU pool 114, and SGW 198. In one example, one or more additional default bearers may be established. Alternatively, or in addition, one or more dedicated bearers may be set-up via the one or more default bearers.

UE 117 may thus engage in various communications via cell site 111 of access network 103 and home EPC network 195 (e.g., a home MNO of UE 117). In addition, the utilization of access network 103 by UE 117 may be recorded by a BBU of BBU pool 114 in one or more records/entries in table 200. For example, UE 117 (e.g., having an identifier of CCC-CCC) may have engaged in one or more voice calls totaling 15 minutes, and which may have been assigned a QCI of "1" and utilized spectrum band X. Table 200 further illustrates entries for communications of another UE having an identifier of BBB-BBB. These entries include a MNO ID of "1," indicating that the UE attaches to EPC network 175 via access network 103. For instance, a first entry for BBB-BBB may relate to one or more communications assigned a QCI of 5 totaling 2 minutes of usage and 10 MB of data usage of spectrum band Y. For instance, BBB-BBB may have streamed two minutes of real-time video. A second entry for BBB-BBB may relate to one or more communications assigned a QCI of 9 totaling 5 minutes of usage and 4 MB of data usage of spectrum band Z. For instance, BBB-BBB may have downloaded two minutes of "best effort" video.

Similarly another UE having an identifier of DDD-DDD may have two entries in the table 200. For instance, the UE having identifier DDD-DDD may have engaged in a video call totaling 2 minutes and 10 MB of data usage, which may have been afforded a priority in accordance with a QCI label of "2" and utilizing spectrum band W. Notably, this entry is similar to the entry for AAA-AAA for QCI 2. However, DDD-DDD has been assigned a different spectrum band. For example, as noted above, examples of the present disclosure may differentiate UEs for different MNOs using a shared RAN. Thus, for example, BBU pool 114 may be instructed, e.g., configured, to preferentially assign video calls for UEs of EPC network 175 to spectrum band X, while UEs of EPC network 195 may be preferentially assigned spectrum band W for video call. For example, the MNO of EPC network 195 may have a license to operate in spectrum band W. Thus, users and/or subscribers of the MNO of EPC network 195 may be steered to spectrum band W when not overloaded. In one example, the UEs of such users/subscribers may still obtain video call services via other spectrum bands if band W is overloaded or the use is preempted (e.g., a CBRS band that may be preempted by governmental priority use). A second entry for DDD-DDD in table 200 may indicate usage of a streaming music service that is assigned a QCI of 8, and which may have been utilized for 10 minutes and incurred 8 MB of data usage within the access network 103 over spectrum band Z. It should be noted that similar entries/records may be maintained in table 200 for UEs assigned to EPC network 105. However, for ease of illustration, such entries are omitted from the example of FIG. 2.

In one example, BBU pool 114 may collectively maintain table 200. For instance, any BBU in BBU pool 114 may add to and update the table 200 based upon usage of the access network 103. For instance, BBU pool 114 may comprise or may have access to a shared memory (e.g., distributed memory) and/or a shared data storage platform that may maintain the table 200. In one example, the table 200 may be specific to cell site 111. Alternatively, or in addition, record in table 200 may be expanded to include a cell site identifier. For instance, records for UEs attaching via cell sites 111-113 may all be included in table 200. In one example, separate tables may be maintained for UEs of each MNO. However, each table may include records across all three cell sites 111-113. In one example, records/entries in the table 200 may be provided to respective EPC networks 105, 175, and 195. For instance, EPC network 105 may be provided with the entries in table 200 for usage of UEs of access network 103 that are connected to EPC network 105. Similarly, EPC network 175 may be provided with the entries in table 200 for usage of UEs of access network 103 that are connected to EPC network 175, and likewise for EPC network 195.

In the example of FIG. 1, cellular network 101 and/or telecommunication service provider network 170 may comprise a host MNO (e.g., an entity that provides, controls, and/or maintains the shared access network 103). In one example, the table 200 may also be provided to EPC network 105 or other components of telecommunication service provider network 170 as the host MNO. For instance, AS 145 may comprise a billing server that may apportion charges for the usage of access network 103 among the respective MNOs (e.g., the telecommunication service provider network 170 and/or EPC network 105 as host MNO, and EPC networks 175 and 195 as guest MNOs.). In one example, BBU pool 114 may provide summary RAN usage statistics to AS 145 or other component(s) of telecommunication service provider network, such as overall usage metrics for UEs associated with a first MNO, overall usage metrics for UEs associated with the first MNO for each QCI, etc., overall usage metrics for UEs associated with a second MNO, overall usage metrics for UEs associated with the second MNO for each QCI, and so forth.

In one example, the table 200, selected entries/records thereof, and/or summary statistics derived from the table 200 may be provided to SON/SDN controller 102. For instance, the SON/SDN controller 102 may be programmed/configured to take one or more automated actions in response to the utilization metrics of access network 103 as contained in the entries of table 200. For instance, SON/SDN controller 102 may communicate with cell sites 111-113 and/or any one or more components thereof, such as eNodeB's, remote radio heads (RRHs), BBU pool 114, etc. via one or more respective control interfaces (e.g., vendor APIs) to remotely configure the settings for the plurality of parameters. The various parameters may include cell site scheduling options, cell handover offset configurations, sector tilt, power on/off settings for cells, sectors, and/or RRHs, a number of BBUs (e.g., from BBU pool 114), and so on.

In accordance with the present disclosure the various parameters may also include which categories of UEs to assign to a particular spectrum band or away from a particular spectrum band (either exclusively or preferentially). For instance, a first category of UEs may include UEs associated with a first MNO, a second category of UEs may include UEs associated with a second MNO, and so on. Alternatively, or in addition, a first category of UEs may include UEs of a first type (e.g., mobile phones of a first manufacturer) associated with a first MNO, a second category of UEs may include UEs of a second type (e.g., mobile phones of a second manufacturer) associated with the first MNO, a third category of UEs may include UEs of the first type associated with a second MNO, a fourth category of UEs may include UEs of the second type associated with the second MNO, and so forth.

Similarly, the SON/SDN controller 102 may activate or deactivate one or more spectrum bands, may permit or deny different categories of UEs access to one or more spectrum bands, may allow UEs of particular categories to use more or less secondary bearers, may allow UEs of particular categories to use more or less secondary bearers on selected spectrum bands, and so forth. In one example, the SON/SDN controller 102 may prioritize access of UEs associated with a first MNO to a particular spectrum band, but may offload such UEs to a different spectrum band, for instance due to congestion. For instance, the first MNO may have a license to operate in the spectrum band and may be responsible for an allowable use of the spectrum band within the shared access network 103. As such, in one example, UEs of the first MNO may be given greater right of access to this spectrum band. In one example, SON/SDN controller 102 may prioritize access of UEs associated with a first MNO to a particular spectrum band, but may permit UEs associated with a second MNO to access the spectrum band when another spectrum band is congested. In one example, SON/SDN controller 102 may cause a change in a load balancing algorithm among two or more of cell sites 111-113, e.g., where there is overlapping cellular coverage (e.g., overlapping cell footprints). In one example, the SON/SDN controller 102 may also determine to reconfigure one or more aspects of EPC network 105, such as by adding or removing MMEs, SGWs, PDN gateways, or the like (e.g., vMMEs, vSGWs, etc.), directing bearer paths for UEs attaching via access network 103 to different available SGWs and/or PDN gateways, allowing or disallowing multiple default bearers via EPC network 105, limiting (or raising a limit) for a number of dedicated bearers, and so forth.

In one example, the SON/SDN controller 102 may determine parameter settings via one or more machine learning model (MLMs) e.g., one or more trained machine learning algorithms (MLAs), such as a reinforcement learning (RL) algorithm (e.g., a deep neural network (DNN), a rule set (e.g., defining rules or "triggers" and corresponding actions), or the like which take at least the RAN utilization metrics as described herein as inputs. In one example, the SON/SDN controller 102 may also determine parameter settings further based on cell level performance indicators, such as throughput, uplink and/or downlink volume/throughput, video user downlink throughput (video specific), radio frequency (RF) conditions, physical resource block (PRB) and/or control channel element (CCE) utilization, active UEs, neighbor relations, handovers, frequency, bandwidth, user geographic distribution, historical information, reference signal received power (RSRP), reference signal received quality (RSRQ), and/or channel quality information (CQI) distribution, timing advance (TA) distribution, cell bitrate, harmonic UE throughput, throughput gap (difference between maximum and minimum UE throughputs), worst throughput, cluster harmonic throughput, a weighted sum of the foregoing, etc. For instance, one or more of these factors may comprise additional predictor(s)/input(s) of a MLM.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, SON/SDN controller 102 may be spilt into separate components to operate as a SON orchestrator and a SDN controller, respectively. Similarly, although the SON/SDN controller 102 is illustrated as a component of EPC network 105, in another example SON/SDN controller 102, and/or other network components may be deployed in an IMS core network 115 instead of being deployed within the EPC network 105, or in other portions of system 100 that are not shown, while providing essentially the same functionality. Similarly, in one example, BBUs of BBU pool 114 may comprise two or more physically separated components. For instance, a BBU may be split into two components: a central unit (CU) and a distributed unit (DU). In this regard, various steps, functions, and/or operations for identifying a first cellular core network associated with a user endpoint from among a plurality of cellular core networks in communication with a radio access network and transmitting a usage record for radio access network usage of the user endpoint to at least one of the first cellular core network or a second cellular core network may reside in the CU, the DU, or both, in accordance with the present disclosure. In one example, functions of different components may be combined into a single device, or into a lesser number of devices than as shown in FIG. 1. For instance, aspects described above with respect to BBU pool 114 and/or component BBUs thereof may be performed by cell site 113, e.g., by a base station, such as an eNodeB, and/or any one or more components thereof.

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, any one or more of cell sites 111-113 may comprise 2G, 3G, 4G and/or LTE radios, e.g., in addition to 5G new radio (NR) functionality (or in accordance with any other future new radio standards). For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 3:
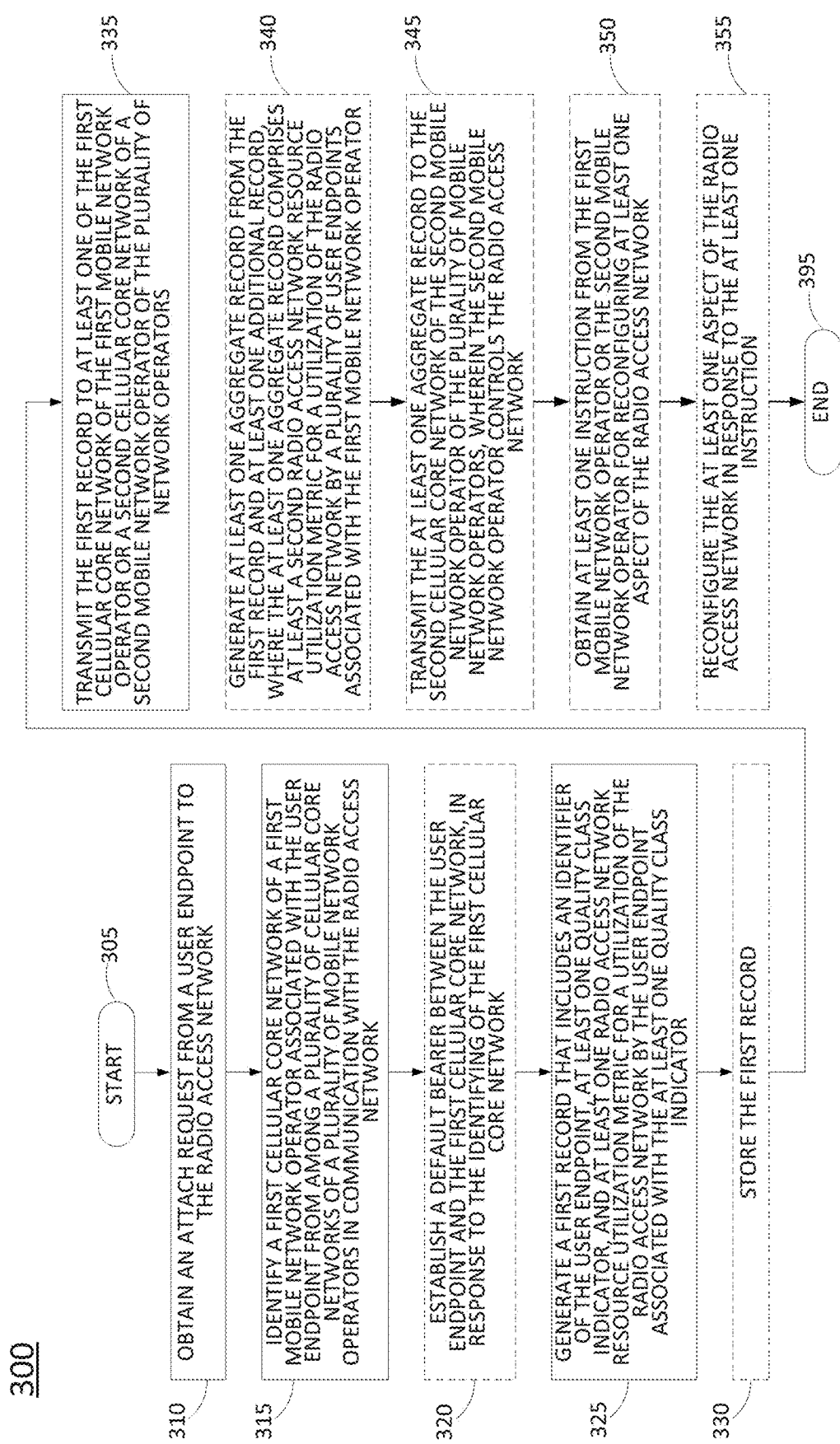
FIG. 3 illustrates a flowchart of an example method for identifying a first cellular core network associated with a user endpoint from among a plurality of cellular core networks in communication with a radio access network and transmitting a usage record for radio access network usage of the user endpoint to at least one of: the first cellular core network or a second cellular core network.

FIG. 3 illustrates, a flowchart of an example method 300 for identifying a first cellular core network associated with a user endpoint from among a plurality of cellular core networks in communication with a radio access network and transmitting a usage record for radio access network usage of the user endpoint to at least one of the first cellular core network or a second cellular core network. In one example, steps, functions and/or operations of the method 300 may be performed by a device as illustrated in FIG. 1, e.g., by BBU pool, a BBU of the BBU pool, a base station, and/or an associated and/or collocated server, or by such device or system, and/or any one or more components thereof in conjunction with one or more other components of the system 100, such as one or more of SON/SDN controller 102, cell sites 111-113, AS 145, MMEs 107, 177, and/or 197, and so forth. In one example, the steps, functions, or operations of method 300 may be performed by a computing device or processing system, such as computing system 400, and/or a hardware processor element 402 as described in connection with FIG. 4 below. For instance, the computing system 400 may represent at least a portion of a cell site, base station, BBU, server, or other device(s) in accordance with the present disclosure. For illustrative purposes, the method 300 is described in greater detail below in connection with an example performed by a processing system. In one example, the steps, functions, or operations of method 300 may be performed by a processing system comprising a plurality of such computing devices as represented by the computing system 400.

The method 300 begins in step 305 and proceeds to step 310. At step 310, the processing system (e.g., of a radio access network (RAN)) obtains an attach request from a user equipment (or "user endpoint" (UE)) to the RAN. The UE may be a user and/or subscriber associated with one of a plurality of mobile network operators (MNOs), e.g., a first MNO or a second MNO. In various examples, the RAN may be operated by the first MNO, the second MNO, or an entity that does not operate a cellular core network. In this regard, the processing system may comprise at least one of: a baseband unit (BBU), central unit (CU), or a distributed unit (DU) of the RAN.

At step 315, the processing system identifies a first cellular core network of a first MNO associated with the UE from among a plurality of cellular core networks of a plurality of MNOs in communication with the RAN. In one example, the plurality of core networks may include at least one public core network and at least one private core network (which may be associated with the first MNO or the second MNO, respectively). In one example, step 315 may include obtaining an identification of the first cellular core network from the UE. In one example, step 315 may include broadcasting a plurality of available cellular core networks that interface with and/or are coupled to the RAN (e.g., cellular core networks that are allowed usage of the RAN as a shared RAN). In such an example, the UE may select one of the available cellular core networks and provide the selection in an attach request (e.g., as an identifier of a selected one of the cellular core networks, e.g., the first cellular core network). Alternatively, or in addition, the processing system may receive a UE identifier from the UE, may perform a lookup, such as via a HSS and/or DRA of a host cellular core network (e.g., a second cellular core network), and may determine that the UE is associated with the first cellular core network (e.g., via a response from the HSS and/or DRA).

At optional step 320, the processing system may establish a default bearer between the UE and the first cellular core network, in response to the identifying of the first cellular core network. In one example, optional step 320 may include establishing a plurality of default bearers between the UE and the first cellular core network. In one example, optional step 320 may further include establishing one or more dedicated bearers.

At step 325, the processing system generates a first record that includes an identifier of the UE, at least one quality class indicator, and at least one radio access network resource utilization metric for a utilization of the RAN by the UE associated with the at least one quality class indicator. The at least one RAN resource utilization metric may include at least one of: a duration of time of one or more calls of the UE, a volume of data transferred for the UE via the RAN, or a bandwidth utilized by UE via the RAN. The identifier of the UE may include an IMSI, IMEI, or other unique identifiers of the UE. In one example, the first record may further include at least one spectrum band utilized by the UE. Alternatively, or in addition, the first record may further include an identification of the first MNO.

At optional step 330, the processing system may store the first record. For instance, in one example, the first record may be stored in a first record set of the RAN. In addition, the first record set may be for the first MNO, and the processing system may maintain a plurality of record sets, each of the plurality of record sets being associated with a different one of the plurality of MNOs. In such case, in one example, the first record may omit an identification of the first MNO (which may be implicit by the storage in the first record set).

At step 335, the processing system transmits the first record to at least one of: a first cellular core network of the first MNO or a second cellular core network of a second MNO of the plurality of network operators. In one example, step 335 may comprise transmitting the first record as part of the first record set or a portion thereof (e.g., storing and sending a plurality of records in batch).

At optional step 340, the processing system may generate at least one aggregate record from the first record and at least one additional record. For instance, the at least one aggregate record may comprise at least a second RAN resource utilization metric for a utilization of the RAN by a plurality of user endpoints associated with the first mobile network operator.

At optional step 345, the processing system may transmit the at least one aggregate record to the second cellular core network of the second MNO of the plurality of MNOs (e.g., where the second MNO controls RAN and the first MNO is a guest MNO that utilizes the RAN).

At optional step 350, the processing system may obtain (e.g., in response to the transmitting of the first record or the at least one aggregate record) at least one instruction from the first MNO or the second MNO for reconfiguring at least one aspect of the RAN.

At optional step 355, the processing system may reconfigure the at least one aspect of the RAN in response to the at least one instruction. For instance, optional step 355 may include activating or deactivating a spectrum band for at least one class of user endpoints (UEs), such as UEs associated with the first MNO (e.g., subscribers of the respective MNOs or those having SIM and/or IMSI assigned to such MNO(s) as the user endpoints' home network(s)). In one example, optional step 355 may comprise assigning the at least one class of user endpoints a different utilization priority for the spectrum band as compared to other classes of user endpoints associated with other MNOs of the plurality of MNOs. Alternatively, or in addition, optional step 355 may comprise changing a primary spectrum band that is assigned to at least one class of user endpoints or to at least one quality class indicator (QCI) for the at least one class of user endpoints from a first spectrum band to a second spectrum band. For instance, the first spectrum band may be a spectrum band that is prioritized for use by the at least one class of user endpoints over other spectrum bands available for use by the RAN. In one example, optional step 355 may comprise changing the primary spectrum band for the at least one QCI for the at least one class of user endpoints when a threshold utilization of the first spectrum band is reached or exceeded. Alternatively, or in addition, optional step 355 may include: changing at least one handover setting for the at least one class of user endpoints, changing power, changing tilt, beam steering, activating deactivating RRHs and or other BBUs, changing a status of user endpoints being serviced by their own MNO to roaming to another MNO (at the same cell site of the RAN), changing a priority with respect to one or more QCIs, such as modifying a queue processing algorithm to prioritize or deprioritize communications for the one or more QCIs, allowing more secondary bearers or less secondary bearers for the one or more QCIs, and so on.

It should be noted that the second MNO may control the RAN (e.g., is an owner and/or operator of the RAN) and may enable shared usage of the RAN by others of the plurality of cellular core networks of the plurality of MNOs. It should also be noted that in this regard, the second MNO may also provide, maintain, and control the processing system performing the method 300 (e.g., as a separate component within the RAN). Alternatively, or in addition, at least a second portion of the processing system may be deployed in the second cellular core network to receive the first record and/or the at least the first aggregate record, and to provide the instruction for reconfiguring at least one aspect of the RAN. For instance, the processing system may further include a self-optimizing network (SON) controller, or the like.

Following step 335 or any of the optional steps 340-355, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 with respect to the UE for additional time periods (e.g., for different instances in which the UE is in a state of "RRC attached" via the same RAN), for additional UEs for the same or a different MNO for the same or additional time periods, and so forth. In one example, the present disclosure may include parallel methods performed by processing systems of the first cellular core network and/or the second cellular core network. For instance, as described above, a SON controller or the like may receive the first record and/or the at least the first aggregate record, may determine one or more settings for one or more configurable parameters of the RAN, and may provide one or more instructions for reconfiguring the RAN accordingly.

In one example, the method 300, or a parallel method performed by a processing system of the second cellular core network, may include the second MNO generating a billing charge for the first MNO based upon the at least one aggregate record. In another example, the method 300 may include providing the first record to both the first MNO and to the second MNO, where the second MNO has access to all of the records and may generate charges for other MNOs accordingly. Similarly, in a parallel method performed by a processing system of the first MNO, the first MNO may apportion charges among its subscribers/user endpoints based on the records provided to the first MNO. In another example, the RAN may be operated by a third party that does not operate a cellular core network (e.g., a RAN-only operator) that may charge guest MNOs based upon their respective user endpoints' usage, e.g., as recorded in the first record, and similar record for other user endpoints attaching to the RAN.

In still another example, a parallel method may include operations performed by a processing system of a UE to obtain indicators of available cellular core networks, to select an available cellular core network according to a selection logic of the UE, to provide an indicator of a desired/selected cellular core network, and to complete an attach procedure to attach to the selected cellular core network via the RAN (or to another available cellular core network as instructed by the RAN, such as when a home and/or primary cellular core network becomes unavailable, an initial attach fails to the home and/or primary cellular core network, and so forth). Thus, these and other modifications are all contemplated within the scope of the present disclosure.

In addition, although not expressly specified above, one or more steps of the example method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components or devices illustrated in FIG. 1 described in connection with the examples of FIGS. 2 and 3 may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for identifying a first cellular core network associated with a user endpoint from among a plurality of cellular core networks in communication with a radio access network and transmitting a usage record for radio access network usage of the user endpoint to at least one of the first cellular core network or a second cellular core network, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, it should be noted that the computing device may employ a plurality of hardware processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for identifying a first cellular core network associated with a user endpoint from among a plurality of cellular core networks in communication with a radio access network and transmitting a usage record for radio access network usage of the user endpoint to at least one of the first cellular core network or a second cellular core network (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/ or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for identifying a first cellular core network associated with a user endpoint from among a plurality of cellular core networks in communication with a radio access network and transmitting a usage record for radio access network usage of the user endpoint to at least one of the first cellular core network or a second cellular core network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system of a radio access network including at least one processor, an attach request from a user equipment to the radio access network;
    identifying, by the processing system, a first cellular core network of a first mobile network operator associated with the user equipment from among a plurality of cellular core networks of a plurality of mobile network operators in communication with the radio access network;
    generating, by the processing system, a first record that includes an identifier of the user equipment, at least one quality class indicator, and at least one radio access network resource utilization metric for a utilization of the radio access network by the user equipment associated with the at least one quality class indicator;
    transmitting, by the processing system, the first record to at least one of: the first cellular core network of the first mobile network operator or a second cellular core network of a second mobile network operator of the plurality of network operators;
    generating, by the processing system, at least one aggregate record from the first record and at least one additional record, wherein the at least one aggregate record comprises at least a second radio access network resource utilization metric for a utilization of the radio access network by a plurality of user endpoints associated with the first mobile network operator; and
    transmitting, by the processing system, the at least one aggregate record to the second cellular core network of the second mobile network operator of the plurality of mobile network operators, wherein the second mobile network operator controls the radio access network.

2. The method of claim 1, wherein the first record further includes an identification of the first mobile network operator.

3. The method of claim 1, further comprising:
    storing the first record.

4. The method of claim 3, wherein the first record is stored in a first record set of the radio access network, wherein the first record set is for the first mobile network operator, wherein the processing system maintains a plurality of record sets, and wherein each of the plurality of record sets is associated with a different one of the plurality of mobile network operators.

5. The method of claim 1, wherein the processing system comprises at least one of:
    a baseband unit of the radio access network;
    a central unit of the radio access network; or
    a distributed unit of the radio access network.

6. The method of claim 1, further comprising:
    obtaining at least one instruction from the first mobile network operator or the second mobile network operator for reconfiguring at least one aspect of the radio access network; and
    reconfiguring the at least one aspect of the radio access network in response to the at least one instruction.

7. The method of claim 6, wherein the reconfiguring the at least one aspect of the radio access network comprises:
    activating a spectrum band for at least one class of user endpoints; or
    deactivating a spectrum band for at least one class of user endpoints.

8. The method of claim 7, wherein the at least one class of user endpoints comprises user endpoints associated with the first mobile network operator.

9. The method of claim 8, wherein the reconfiguring the at least one aspect of the radio access network comprises assigning the at least one class of user endpoints a different utilization priority for the spectrum band as compared to other classes of user endpoints associated with other mobile network operators of the plurality of network operators.

10. The method of claim 6, wherein the reconfiguring the at least one aspect of the radio access network comprises:
    changing a primary spectrum band that is assigned to at least one class of user endpoints or to at least one quality class indicator for the at least one class of user endpoints from a first spectrum band to a second spectrum band.

11. The method of claim 10, wherein the first spectrum band is a spectrum band that is prioritized for use by the at least one class of user endpoints over other spectrum bands available for use by the radio access network.

12. The method of claim 10, wherein the primary spectrum band is changed for the at least one quality class indicator for the at least one class of user endpoints when a threshold utilization of the first spectrum band is reached or exceeded.

13. The method of claim 1, further comprising:
   establishing a default bearer between the user equipment and the first cellular core network, in response to the identifying of the first cellular core network.

14. The method of claim 1, wherein the plurality of core networks includes:
   at least one private core network; and
   at least one public core network.

15. The method of claim 1, wherein the at least one radio access network resource utilization metric comprises at least one of:
   a duration of time of one or more calls of the user equipment via the radio access network;
   a volume of data transferred for the user equipment via the radio access network; or
   a bandwidth utilized by user equipment via the radio access network.

16. The method of claim 1, wherein the first record further includes at least one spectrum band utilized by the user equipment.

17. The method of claim 1, wherein the radio access network is operated by:
   the first mobile network operator;
   the second mobile network operator of the plurality of mobile network operators; or
   an entity that does not operate a cellular core network.

18. A non-transitory computer-readable medium storing instructions which, when executed by a processing system of a radio access network including at least one processor, cause the processing system to perform operations, the operations comprising:
   obtaining an attach request from a user equipment to the radio access network;
   identifying a first cellular core network of a first mobile network operator associated with the user equipment from among a plurality of cellular core networks of a plurality of mobile network operators in communication with the radio access network;
   generating a first record that includes an identifier of the user equipment, at least one quality class indicator, and at least one radio access network resource utilization metric for a utilization of the radio access network by the user equipment associated with the at least one quality class indicator;
   transmitting the first record to at least one of: the first cellular core network of the first mobile network operator or a second cellular core network of a second mobile network operator of the plurality of network operators;
   generating at least one aggregate record from the first record and at least one additional record, wherein the at least one aggregate record comprises at least a second radio access network resource utilization metric for a utilization of the radio access network by a plurality of user endpoints associated with the first mobile network operator; and
   transmitting the at least one aggregate record to the second cellular core network of the second mobile network operator of the plurality of mobile network operators, wherein the second mobile network operator controls the radio access network.

19. An apparatus comprising:
   a processing system including at least one processor; and
   a computer-readable medium storing instructions which, when executed by the processing system when deployed in a radio access network, cause the processing system to perform operations, the operations comprising:
      obtaining an attach request from a user equipment to the radio access network;
      identifying a first cellular core network of a first mobile network operator associated with the user equipment from among a plurality of cellular core networks of a plurality of mobile network operators in communication with the radio access network;
      generating a first record that includes an identifier of the user equipment, at least one quality class indicator, and at least one radio access network resource utilization metric for a utilization of the radio access network by the user equipment associated with the at least one quality class indicator;
      transmitting the first record to at least one of: the first cellular core network of the first mobile network operator or a second cellular core network of a second mobile network operator of the plurality of network operators;
      generating at least one aggregate record from the first record and at least one additional record, wherein the at least one aggregate record comprises at least a second radio access network resource utilization metric for a utilization of the radio access network by a plurality of user endpoints associated with the first mobile network operator; and
      transmitting the at least one aggregate record to the second cellular core network of the second mobile network operator of the plurality of mobile network operators, wherein the second mobile network operator controls the radio access network.

20. The apparatus of claim 19, wherein the first record further includes an identification of the first mobile network operator.

* * * * *